United States Patent [19]

Kusmer et al.

[11] Patent Number: 4,953,276
[45] Date of Patent: Sep. 4, 1990

[54] APPARATUS FOR INSERTING VALVE SEATS IN VALVE BODIES

[75] Inventors: Daniel P. Kusmer, Stafford; Paul A. Yohner, Houston, both of Tex.

[73] Assignee: Keystone International Holdings Corp., Houston, Tex.

[21] Appl. No.: 383,370

[22] Filed: Jul. 21, 1989

[51] Int. Cl.$^5$ .............................................. B23P 19/04
[52] U.S. Cl. ........................................ 29/235; 29/252
[58] Field of Search ................. 29/450, 451, 235, 252, 29/213 R, 261

[56] References Cited

U.S. PATENT DOCUMENTS

| | | | |
|---|---|---|---|
| 2,468,286 | 4/1979 | Behlert | 29/235 |
| 2,961,755 | 11/1960 | Prince | 29/235 |
| 4,389,763 | 6/1983 | Marsh | 29/252 |

*Primary Examiner*—Robert C. Watson
*Attorney, Agent, or Firm*—Browning, Bushman, Anderson & Brookhart

[57] ABSTRACT

An apparatus for inserting a resilient valve seat into a valve body, the valve body being of a type having a radially inwardly projecting annular rib which defines a bore through the valve body, the valve seat being generally annular and having an annular web portion, a first annular flange portion projecting radially outwardly from a first end of the web portion and a second annular flange portion projecting radially outwardly from a second end of the web portion to define an annular, radially outwardly opening channel for receiving the rib, the apparatus including a frame which has an opening and having a plate for positioning a valve body adjacent the opening such that the bore in the valve body and the opening in the frame are in register, a plunger assembly slidably mounted in the frame, the plunger assembly having a mounting head and a plurality of circumferentially spaced grabbing elements secured to the mounting head, the grabbing elements including projections to engage one of the annular flange portions of the valve seat such that at the mounting head is moved in a given direction in the frame, the grab elements engage the rib in the valve body resulting in a distortion or folding of the valve seat such that the engaged annular flange portion can pass through the bore defined by the rib.

9 Claims, 3 Drawing Sheets

APPARATUS FOR INSERTING VALVE SEATS IN VALVE BODIES

BACKGROUND OF THE INVENTION

1. Field of the Invention

The present invention relates to an apparatus for inserting a valve seat into a valve body and, more particularly, for inserting an annular, resilient valve seat into a butterfly valve body.

2. Description of the Background

Butterfly valves typically have an annular, resilient valve seat which is received in a valve body, the disk of the valve being mounted so as to form an interference fit with the valve seat. One such butterfly valve construction includes a valve body having a radially inwardly extending, annular rib which defines a generally circular bore through the valve body. The resilient valve seat has an annular web portion and two annular, radially outwardly extending flange portions which depend from opposite ends of the web portion and which form a radially outwardly opening, circumferentially extending channel, the channel having a cross-sectional shape which is complementary to the cross-sectional shape of the annular rib in the valve body. Accordingly, when the valve seat is received in the valve body, it is effectively mechanically locked to the valve body to prevent it from being dislodged when the valve is in service and under pressure. Butterfly valves of this type are shown, for example, in U.S. Pat. No. 2,994,342.

In valve seats such as disclosed in the aforesaid patent, insertion of the seat into the valve body is accomplished by manually folding the valve seat sufficiently to permit one of the flange portions to pass through the bore defined by the annular rib and then releasing the valve seat so that it returns to its normal configuration with the annular rib received in the channel.

In U.S. Pat. No. 4,685,611, there is disclosed a butterfly valve construction much as described above with the exception that the resilient valve seat contains a resilient, metal reinforcing member disposed internally of the resilient portion of the seat. Because of this reinforcing member, manual insertion of the valve seat into the valve body is difficult, though possible, because the reinforcing member tends to resist the folding necessary to distort the seat sufficiently so that one of the flange portions can be passed through the bore defined by the annular ribs. The problem is particularly acute with respect to small diameter valves wherein the reinforcing member renders the seat quite rigid and makes insertion difficult.

SUMMARY OF THE INVENTION

It is therefore an object of the present invention to provide an apparatus for inserting a resilient valve seat into a valve body.

Another object of the present invention is to provide an apparatus for inserting an annular, resilient valve seat into a butterfly valve body having an annular rib which is received in an annular channel in the valve seat.

The above and other objects of the present invention will become apparent from the drawings, the description and the claims.

The present invention provides an apparatus for inserting an annular, resilient valve seat of the type having an annular, radially outwardly opening channel defined by an annular rib and first and second annular flanges into a valve body having an annular, radially inwardly projecting annular rib such that the annular rib is received in the channel in the valve seat. The apparatus includes a frame which has an opening, and a means for positioning the valve body adjacent the frame such that the bore in the valve body formed by the annular rib is in register with the opening in the frame. A plunger assembly slidably mounted in the frame includes a mounting means to which is secured a grab means. There are means to move the mounting means and attached grab means through the registering opening in the frame and the bore in the valve body to a position where the grab means can grab one of the flange members on the valve seat disposed on the side of the valve opposite the frame and pull the valve seat toward the frame. Movement of the mounting means toward the frame brings the grab means into engagement with the annular rib which acts to compress or collapse the grab means forcing the valve seat to fold or distort radially inwardly sufficiently to permit the first flange portion to pass through the bore defined by the annular rib.

DESCRIPTION OF PREFERRED EMBODIMENTS

Figure 1:
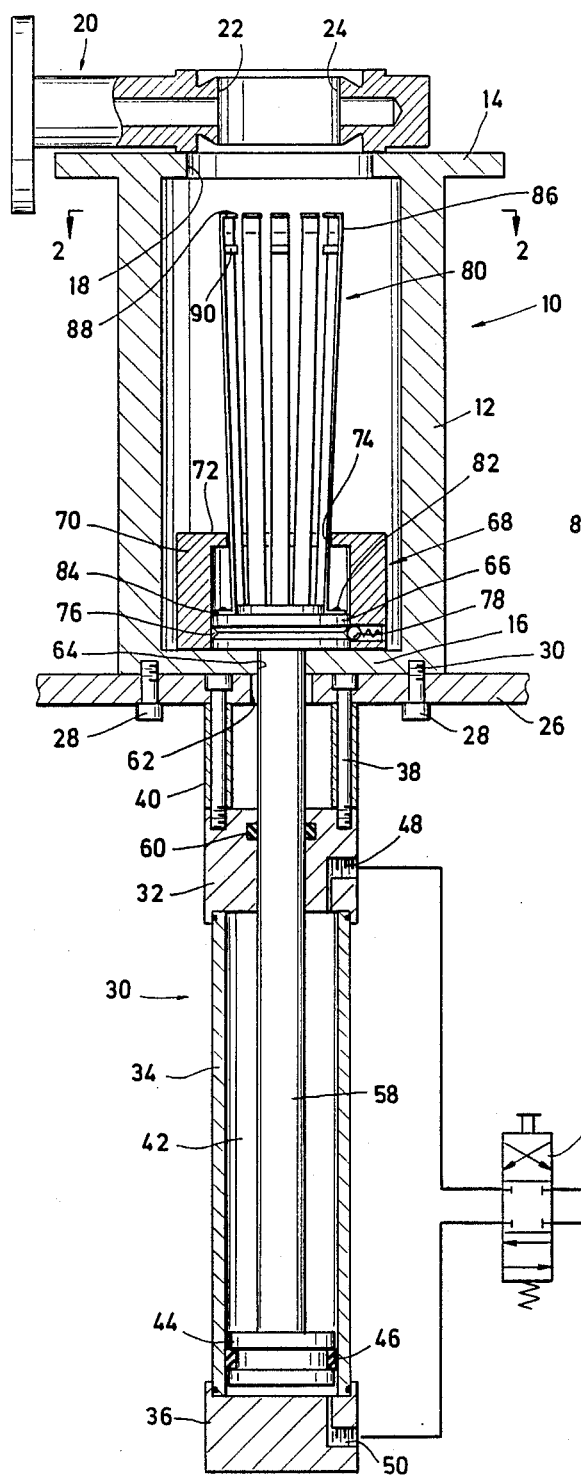
FIG. 1 is an elevational view, partly in section, of the apparatus of the present invention.

Referring first to FIG. 1, the apparatus is seen to comprise a virtually mounted frame shown generally as 10. While the apparatus is shown as being mounted in a generally vertical disposition, it will be understand that its use is not so limited. Frame 10 has an annular wall 12 and first and second end walls 14 and 16, respectively. End wall 14 is in the form of an annular plate having a circular opening 18 therethrough. End wall 14, as seen hereafter, serves as a means to position a valve body 20 thereon.

As shown, valve body 20 has an annular, radially inwardly projecting rib 22 which defines a circular bore 24 through valve body 20. Valve body 20 is positioned on end wall 14 such that circular bore 24 is in register with annular opening 18 in end wall 14.

Frame 10 is secured to a work table 26 by means of bolts 28 received in tapped bores 30 in end wall 16 of frame 10. Also secured to work table 26 is a hydraulic piston and cylinder assembly shown generally as 30. Piston and cylinder assembly 30 includes a chamber 42 formed by an end block 32, cylindrical side wall 34 and a second end block 36. End block 32 is secured to work table 26 by means of bolts 38 which are slidably received in tubular spacers 40. Disposed internally of the chamber 42 is a piston 44 carrying a piston ring 46. Piston and cylinder assembly 30 is of the double acting type. For this purpose, first end block 32 has a port 48 through which hydraulic fluid can ingress and egress into chamber 42 on one side of piston 44. Likewise, end block 36 has a port 50 through which hydraulic fluid can ingress and egress into chamber 42 on the opposite side of piston 44. A pump 52 supplies fluid from hydraulic fluid reservoir 54 through a hydraulic controller 56. Accordingly, fluid can be introduced into chamber 42 on either side of piston 44 and evacuated from the opposite side to thereby effect reciprocation of piston 44 axially through chamber 42.

A piston rod 58 is connected to piston 44 and extends through end block 32, sealing between piston rod 58 and end block 32 being accomplished by means of an O-ring 60. Piston rod 58 extends through an opening 62 in work table 26 and a registering opening 64 in end wall 16 of frame 10. Piston rod 58 is attached to a generally circular mounting head 66 which is slidably disposed in a cup-shaped member 68, cup-shaped member 68 having a generally cylindrical side wall 70 and an end wall 72 which defines a generally circular opening 74 therein. Mounting head 66 has an annular groove 76 which extends around the periphery, groove 76 being generally V-shaped as shown. Cup-shaped member 68 is provided with a spring-loaded detent 78. As seen in FIG. 1, detent member 78 engages groove 76 for a reason to be explained hereinafter.

Figure 2:
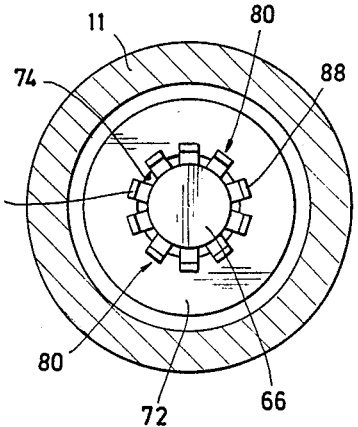
FIG. 2 is a view taken along the line 2—2 of FIG. 1.

Secured to mounting head 66 are a series of grab means in the form of fingers shown generally as 80. Each of fingers 80 is made of a spring metal or similar resilient material and has one end secured to mounting head 66 by means of a bolt 82 extending through a flange portion 84. As best seen with reference to FIG. 2, each of the fingers 80 is secured to mounting head 66 so as to be circumferentially disposed and spaced from one another. The ends 86 of fingers 80 distal flange 84 are provided with lateral first and second projections, projections 88 and 90 facing generally radially inwardly and being axially spaced from one another by a distance sufficient to receive the first flange portion of the valve seat therebetween (See FIG. 5). In effect, projections 88 and 90 together with the position of fingers 80 therebetween form a collapsible cage or engagement means. Fingers 80 extend through circular opening 74 in end wall 70 of cup-shaped member 68. Collectively, piston rod 58, cup-shaped member 68, mounting head 66 and fingers 80 form a plunger assembly operative in a manner hereinafter described.

Referring now to FIGS. 3-8, the operation of the apparatus will be explained. By proper activation of hydraulic controller 56, piston rod 58 will be caused to move in the direction of arrow A (FIG. 3) carrying with it cup-shaped member 68 and head 66. Because of the engagement of detent member 78 in groove 76 of head 66, head member 66 and cup-shaped member 68 move in unison, mounting head 66 retaining its position relative to cup-shaped member 68. As can be seen, in this position (FIG. 3), fingers 80 are in a collapsed or compressed state and form an annular bundle of grab means. In effect, end wall 72 defining circular opening 74 acts to collimate fingers 80. As seen with reference to FIG. 3, the collapsed, annular bundle of fingers 80 has an OD which is less than the ID of circular bore 24 defined by rib 22 and opening 18 in end wall 14. Accordingly, as the piston rod 58 moves mounting head 66 into abutment with end wall 14 of frame 10, i.e., to the position shown in FIG. 3, the bundle of fingers 80 pass through opening 18 of frame 10 and registering bore 24 of valve body 20.

Figure 4:
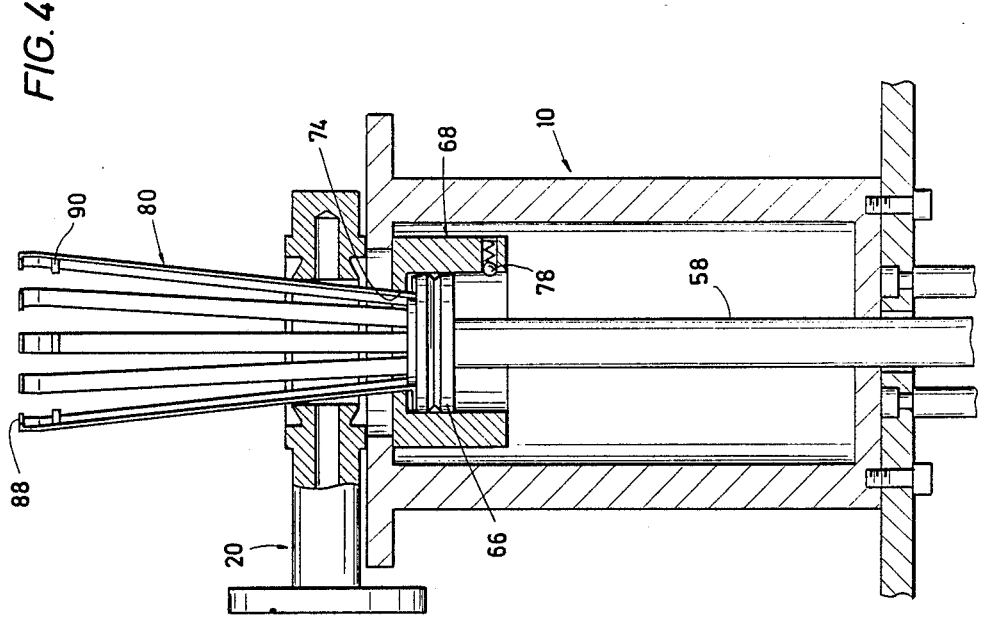
FIGS. 3–8 are views similar to FIG. 1 showing sequentially how the apparatus is used to insert a valve seat into a butterfly valve body.
Figure 3:
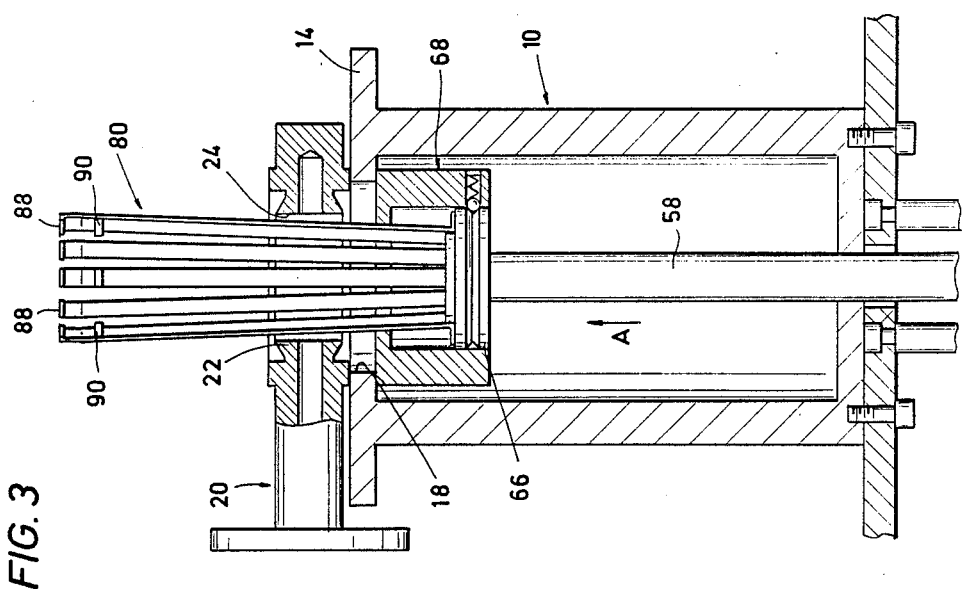

Continued movement of piston rod 58 in the direction of arrow A results in an unlatching of mounting head 66 from cup-shaped member 68 due to the fact that the force of the spring-loaded detent 78 holding mounting head 66 to cup-shaped member 68 is overcome. Accordingly, mounting head 66 will continue to move until it abuts end wall 72 of cup-shaped member 68, i.e., it achieves the position shown in FIG. 4, at which point fingers 80 will no longer be confined by the encircling portion of end wall 72 defining opening 74 in cup-shaped member 68 and will expand to form a generally frustoconical array as shown in FIG. 4. It should be observed that the diameter of circular opening 74 in cup-shaped member 68 is such as to ensure that resilient fingers 80 are allowed to expand radially outwardly as shown in FIG. 4.

Figure 5:
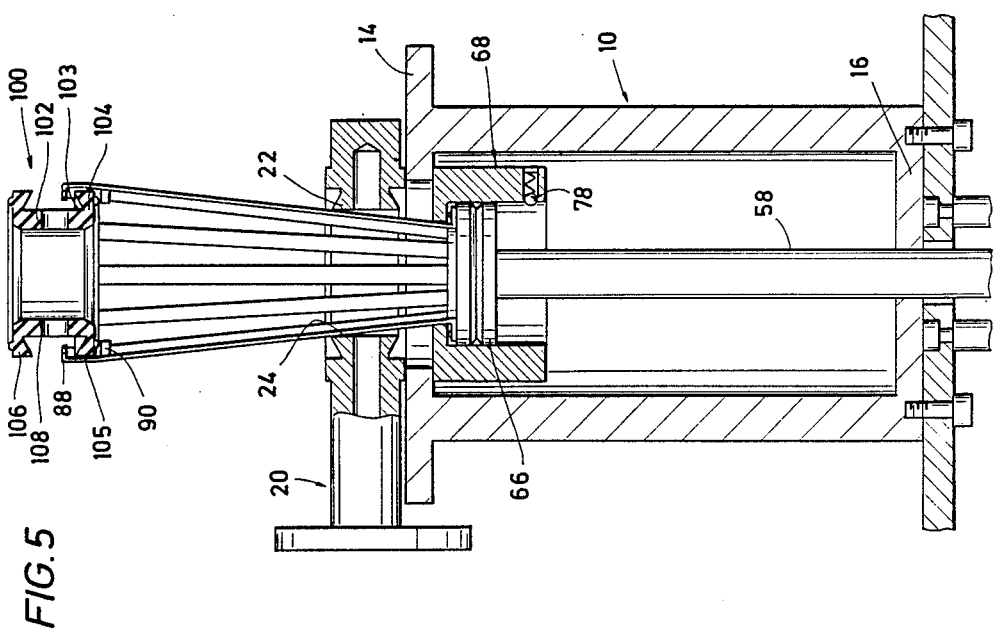
Figure 8:
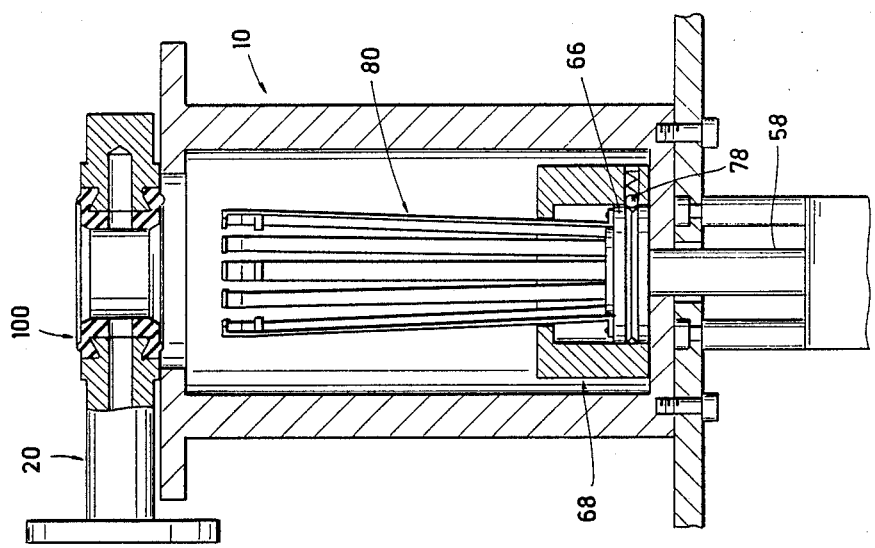

Referring now to FIG. 5, fingers 80 are shown in the same position as displayed in FIG. 4; however, in FIG. 5, a valve seat, indicated generally as 100, is being supported by fingers 80. Valve seat 100 has a generally annular web 102, a first annular, radially outwardly extending flange 104 depending from one end of web 102 and a second annular, radially outwardly extending flange 106 depending from the other end of web 102. First flange 104 has an annular inner surface 103 and an annular, radially outwardly facing surface 105. As seen, there is thus formed an annularly extending radially outwardly opening channel 108 which has a shape complementary to annular rib 22. While as shown, annular rib is profiled so as to be dove-tailed when viewed in cross section, it will be understood that annular rib can be rectangular in cross-sectional configuration or, for that matter, numerous other shapes, channel 108 having a corresponding complementary cross-sectional shape. As seen with reference to FIG. 5, projections 88 and 90 are spaced an axial distance apart sufficient to permit first flange portion 104 to be received therebetween. In effect, second projections 90 form a series of coplanar ledges upon which first flange portion 104 rests, the portions of fingers 80 between first and second projections 88 and 90 being disposed in generally surrounding relationship to first flange portion 104 radially outwardly of radially outwardly facing surface 105.

Figure 6:
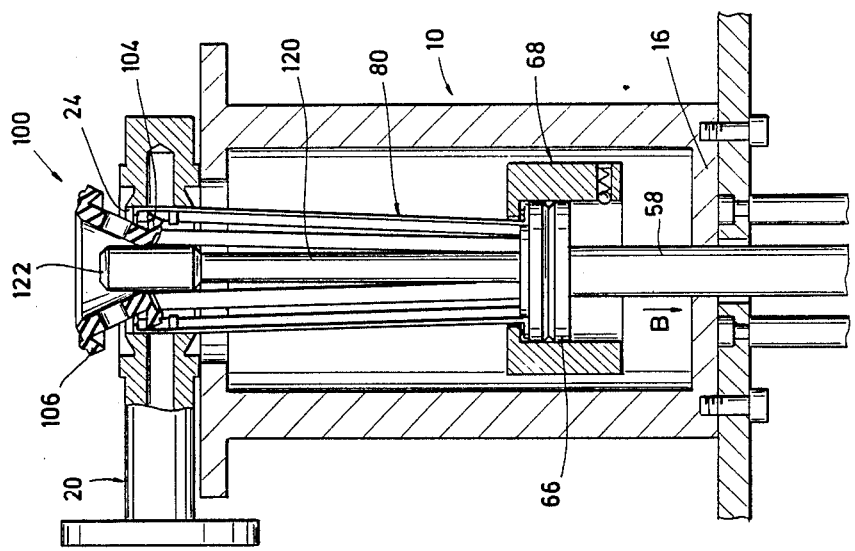

By proper operation of hydraulic controller 56, piston rod 58 can be caused to reverse direction and move in the direction shown in arrow B (FIG. 6). Movement of piston rod 58 in the direction of arrow B retracts mounting head 66 away from end wall 14 toward end wall 16 of frame 10. Since cup-shaped member 68 and mounting head 66 are slidably mounted with respect to one another, and because of the vertical orientation, cup-shaped member 68, by means of gravity, follows mounting head 66. As first flange portion 104 of valve seat 100, trapped by the annular cage or engagement means defined by projections 88, 90 and the portion of finger 80 therebetween, approaches bore 24, annular rib 22 acts to collapse or compress the array of fingers 80 radially inwardly with a resulting distortion or folding of at least a portion of valve seat 100 such that first flange portion 104 is able to pass through bore 24. It will be observed that, as the valve seat 100 begins to distort, projections 88 have engaged the annular, inner surface 106 of first flange portion 104. In effect, fingers 80 in conjunction with annular rib 22 simultaneously pull and deform or distort valve seat 100 to permit first flange portion 104 to pass through bore 24.

FIG. 6 also shows a modified embodiment wherein a rod 120 has one end secured to mounting head 66 and is provided at its opposite end with a guide 122 which serves as a mandrel around which valve seat 100 is distorted when passing through the bore defined by rib 22. Guide 122 ensures that relatively soft or highly resilient valve seats will not distort excessively to the point where the entire valve seat 100 will be pulled through the valve 20. It will be appreciated that guide 122 will be appropriately sized to permit valve seat 100 to distort radially inwardly sufficient such that first flange portion 104 can pass through bore 24 while preventing excessive distortion resulting in the entire valve seat 100 being pulled through bore 24.

Figure 7:
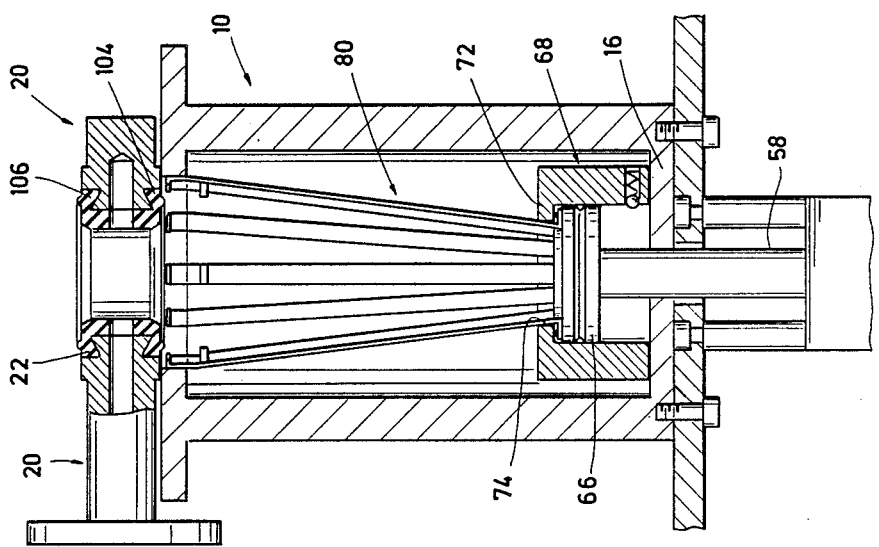

Referring now to FIG. 7, when first flange portion 104 has passed through bore 24, second flange portion 106 will engage or catch on one side of annular rib 102, thereby holding valve seat 100 in valve 20 while fingers 80 slip off first flange portion 104 and allow seat 100 to return to its undistorted position such that rib 22 will be received in channel 108. In this position, fingers 80 are now in an expanded position, cup member 68 having bottomed against end wall 16. Continued movement of piston rod 58 in the direction of arrow B will now move mounting head 66 downward relative to cup member 68 which forces fingers 80 to be collapsed or compressed radially inwardly because of the engagement of fingers 80 with wall 72 defining circular opening 74. Mounting head 66 will continue to move downward until detent member 78 engages annular groove 66 to thereby releasably lock cup member 68 to mounting head 66. At this point, fingers 88 will have returned to their original, collapsed or compressed position shown in FIG. 1. Valve 20 having seat 100 disposed therein can now be removed from plate 14 and the process repeated.

The foregoing represents only one preferred embodiment of the invention, and it will be understood that numerous modifications may suggest themselves to those skilled in the art. Accordingly, it is intended that the scope of the present invention be limited only by the claims which follow.

What is claimed is:

1. An apparatus for inserting a resilient valve seat into a valve body, said valve body having a radially inwardly projecting annular rib, said annular rib defining a bore through said valve body, said valve seat being generally annular and having an annular web portion, a first annular flange portion projecting radially outwardly from a first end of said web portion and a second annular flange portion projecting radially outwardly from a second end of said web portion thereby defining an annular, radially outwardly opening channel for receiving said rib, said first flange portion having an annular, inner surface partially defining said channel and an annular, radially outwardly facing surface, comprising:

a frame, said frame having an opening;
means for positioning said valve body adjacent said opening in said frame such that said opening in said frame and said bore in said valve body are in register; and
a plunger assembly slidably mounted in said frame, said plunger assembly including:
a mounting means,
a plurality of spaced, circumferentially disposed fingers secured to said mounting means, said fingers including engagement means having a first means to engage the inner surface of said first flange portion and a second means to position adjacent said radially outwardly facing surface of said flange portion,
said plunger assembly further including means, operatively connected to said mounting means, to effect positioning of said fingers between a first, compressed position when said mounting means is in a first position in said frame and means to expand said fingers into a second, expanded position when said mounting means is in a second position in said frame and said fingers are positioned such that said engagement means is positioned on the opposite side of said valve body from said frame, means to move said plunger assembly such that said fingers can be selectively reciprocated through said opening in said frame and said bore in said valve body and that said engagement means can be positioned on the opposite side of said valve body from said frame, whereby said valve seat can be disposed such that said first means of said engagement means engages said inner surface of said first flange portion and said second means of said engagement means is positioned adjacent said radially outwardly facing surface of said first flange portion whereby as said plunger means is moived in a direction toward said frame, said annular rib compresses said fingers inwardly and said valve seat is radially, inwardly distorted sufficient to permit said first flange portion to pass through said bore defined by said rib.

2. The apparatus of claim 1 wherein said fingers have one end secured to said mounting means, said engaged means being disposed on the ends of said fingers distal said secured end.

3. The apparatus of claim 1 wherein said fingers are resiliently bias so as to expand to said second position.

4. The apparatus of claim 1 wherein said mounting means includes a head, said head being selectively, slidably disposed in a cup member, said cup member having an end wall and an annular side wall, said end wall having a port, said fingers extending through said port and being secured to said head.

5. The apparatus of claim 4 wherein said head is movable in said cup member from a first terminal position to a second terminal position, said fingers being in the compressed position when said head is in said first terminal position, said fingers being in the expanded position when said head is in said second terminal position.

6. The apparatus of claim 5 including means to releasably latch said head to said cup member when said head is in said first terminal position.

7. The apparatus of claim 1 wherein said means to move said plunger assembly includes a hydraulic piston-cylinder assembly.

8. The apparatus of claim 1 wherein said engagement means includes a first projection extending laterally inwardly from said finger and a second projection extending laterally inwardly from said finger, said second projection being spaced from said first projection by a distance sufficient to permit said first flange portion to be received between said first and second projection.

9. The apparatus of claim 1 wherein said frame includes a plate, said opening being formed in said plate, said plate being generally horizontally disposed, said plate defining a means for positioning said valve body adjacent said opening.

* * * * *